(12) United States Patent
Schuller et al.

(10) Patent No.: US 9,897,206 B2
(45) Date of Patent: Feb. 20, 2018

(54) ACTUATOR FOR ACTUATING A PARKING LOCK

(71) Applicant: Audi AG, Ingolstadt (DE)

(72) Inventors: Dietmar Schuller, Altmannstein (DE); Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/412,645

(22) PCT Filed: Jul. 3, 2013

(86) PCT No.: PCT/EP2013/001948
§ 371 (c)(1),
(2) Date: Jan. 2, 2015

(87) PCT Pub. No.: WO2014/005702
PCT Pub. Date: Jan. 9, 2014

(65) Prior Publication Data
US 2015/0167843 A1 Jun. 18, 2015

(30) Foreign Application Priority Data
Jul. 4, 2012 (DE) .......................... 10 2012 013 373

(51) Int. Cl.
*F16H 63/34* (2006.01)
*B60T 1/06* (2006.01)
(Continued)

(52) U.S. Cl.
CPC .......... *F16H 63/3433* (2013.01); *B60T 1/005* (2013.01); *B60T 1/062* (2013.01);
(Continued)

(58) Field of Classification Search
CPC ............. F16H 63/3433; F16H 63/3458; F16H 63/3483; F16H 63/3475; F16H 63/34;
(Continued)

(56) References Cited

U.S. PATENT DOCUMENTS 2,974,752 A * 3/1961 Howard .............. F16H 63/3475
188/163
5,048,656 A 9/1991 Braun
(Continued)

FOREIGN PATENT DOCUMENTS

DE 196 25 019 1/1998
DE 198 20 920 11/1999
(Continued)

OTHER PUBLICATIONS

International Search Report issued by the European Patent Office in International Application PCT/EP2013/001948 dated Aug. 12, 2013.

*Primary Examiner* — Terry Chau
(74) *Attorney, Agent, or Firm* — Henry M. Feiereisen LLC

(57) ABSTRACT

An actuator for activating a parking lock, in particular for automatic transmissions in motor vehicles, includes a hydraulic piston which is guided in a cylinder and which activates a locking pawl for a parking lock wheel in the transmission by way of an actuating rod. The piston disengages the parking lock against the force of a preload spring which engages the parking lock in the pressureless state. An electromagnetically activated locking device can positively secure the piston in the disengaged position, with the locking device securing the piston relative to a guide sleeve attached to the cylinder with radially extendable locking elements. To improve system protection, the piston can also be secured in a positively locking fashion by the locking device in the position corresponding to the engaged state of the parking lock.

12 Claims, 1 Drawing Sheet

(51) Int. Cl.
    *F16D 63/00*         (2006.01)
    *F16D 65/28*         (2006.01)
    *B60T 1/00*          (2006.01)

(52) U.S. Cl.
    CPC ........... *F16D 63/006* (2013.01); *F16D 65/28* (2013.01); *F16H 63/3475* (2013.01); *F16H 63/3483* (2013.01)

(58) Field of Classification Search
    CPC . B60T 1/005; B60T 1/06; B60T 1/062; F16D 63/006; F16D 65/28
    See application file for complete search history.

(56) References Cited

U.S. PATENT DOCUMENTS

| | | | |
|---|---|---|---|
| 5,919,112 | A | 7/1999 | Michael et al. |
| 6,247,624 | B1 | 6/2001 | Rundberg |
| 6,471,027 | B1 | 10/2002 | Gierer et al. |
| 7,125,058 | B2 * | 10/2006 | Hawthorne ......... E05B 47/0002 294/82.28 |
| 2004/0011609 | A1 | 1/2004 | Schmid |
| 2007/0283735 | A1 | 12/2007 | Schweiher et al. |
| 2009/0158877 | A1 * | 6/2009 | Vernacchia ............. F16H 61/22 74/473.24 |
| 2011/0023647 | A1 | 2/2011 | Engel et al. |
| 2013/0118852 | A1 | 5/2013 | Schuller et al. |
| 2015/0008092 | A1 * | 1/2015 | Mang ...................... F16D 63/34 192/219.4 |
| 2015/0159752 | A1 * | 6/2015 | Popp ....................... F16H 63/34 192/219.4 |

FOREIGN PATENT DOCUMENTS

| | | |
|---|---|---|
| DE | 199 34 156 | 12/1999 |
| DE | 198 34 156 | 2/2000 |
| DE | 100 37 565 | 4/2002 |
| DE | 102006022963 | 11/2007 |
| DE | 102007000637 | 5/2008 |
| DE | 102008011898 | 9/2009 |
| DE | 102008026123 | 12/2009 |
| DE | 102011014815 | 10/2011 |
| EP | 1 855 033 | 11/2007 |
| EP | 2 458 226 | 5/2012 |
| WO | WO 02/10619 | 2/2002 |

\* cited by examiner

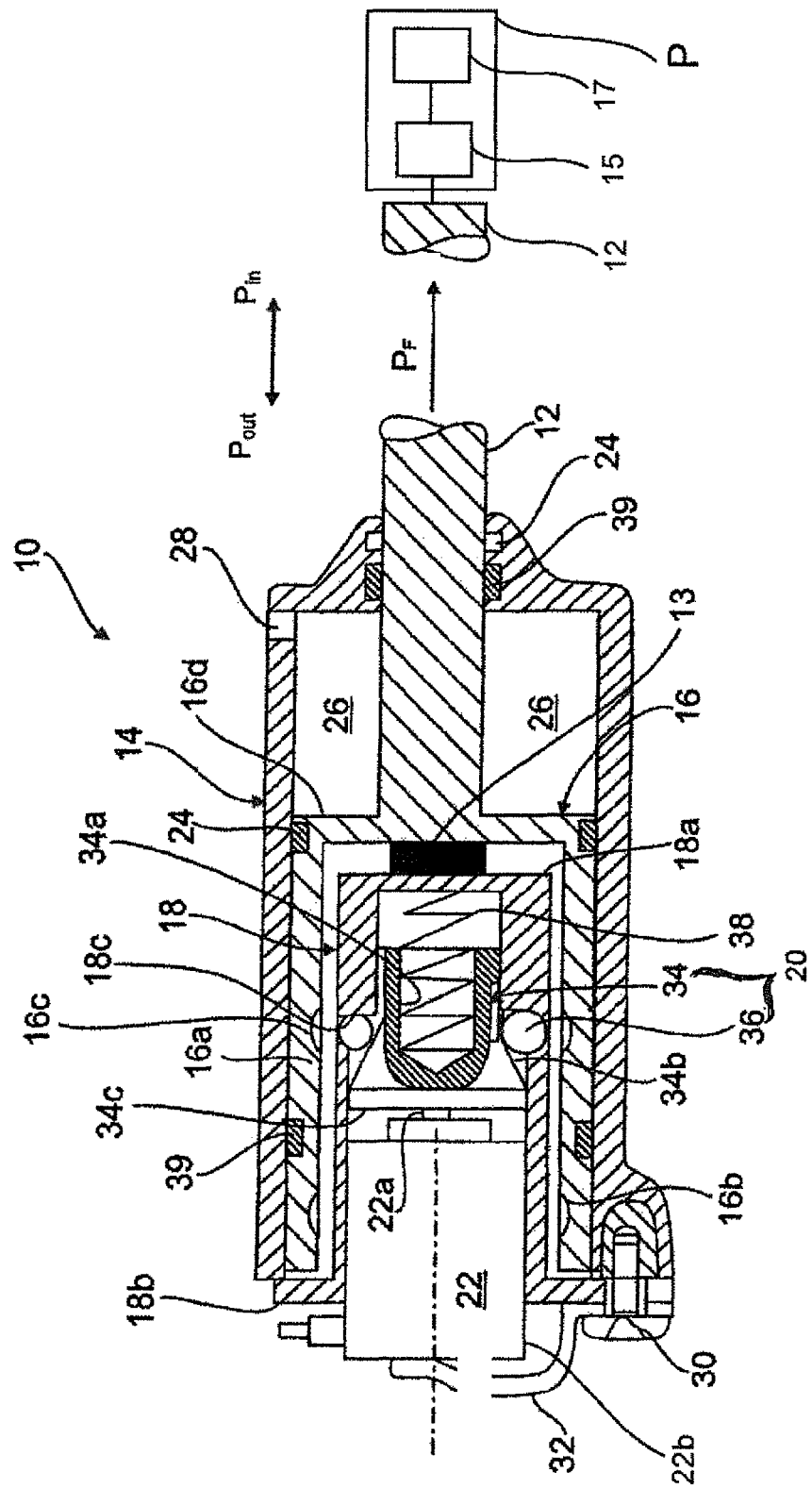

ACTUATOR FOR ACTUATING A PARKING LOCK

CROSS-REFERENCES TO RELATED APPLICATIONS

This application is the U.S. National Stage of International Application No. PCT/EP2013/001948, filed Jul. 3, 2013, which designated the United States and has been published as International Publication No. WO 2014/005702 and which claims the priority of German Patent Application, Serial No. 10 2012 013 373.1, filed Jul. 4, 2012, pursuant to 35 U.S.C. 119(a)-(d).

BACKGROUND OF THE INVENTION

The present invention relates to an actuator for activating a parking lock, in particular for automatic transmissions in motor vehicles.

A actuator of the generic type uses a shift-by-wire transmission control and includes in addition to the hydraulically controlled design of the parking lock an electromagnetic locking device which prevents an "engagement" of the parking brake, for example, in case of failure of the hydraulic system. The locking mechanism hereby locks the piston of the actuator via radially extendable locking elements with respect to a guide sleeve attached to the cylinder.

SUMMARY OF THE INVENTION

It is an object of the invention to further structurally improve an actuator of the generic type in terms of their functional characteristics and design features with simple means.

The solution to this problem is accomplished with an actuator for actuating a parking lock, in particular for automatic transmissions in motor vehicles, with a piston which is guided in a cylinder and actuates via an actuating rod a locking pawl for a parking lock wheel in the transmission, wherein the piston disengages the parking lock with an applied hydraulic pressure against the force of an integrated preload spring and engages in the unpressurized state the preload spring in the parking lock, and wherein further an electromagnetically actuatable locking device is provided, which positively locks the piston in the disengaged position and which secures the piston relative to a guide sleeve attached to the cylinder by way of radially extendible locking elements, wherein the piston can be positively secured by way of the locking device also in the position corresponding to the engaged state of the parking lock.

According to the invention, the piston can be positively secured by way of the locking device also in the position corresponding to the engaged state of the parking lock. The locking device thus acts not only in the disengaged position of the parking lock, but also in the engaged position, whereby when the electromagnets are at least temporarily energized, the parking lock is positively secured against unintentional release, for example due to a defect in a hydraulic control valve or other system error, using simple measures.

In a particularly advantageous embodiment of the invention, the piston may have a tubular section and the locking device with the electromagnet and the guide sleeve may be arranged inside the tubular portion. With this measure, the overall length of the actuator can be substantially shortened, while still performing the two locking functions by way of the locking elements.

In a structurally favorable configuration, two internal grooves corresponding to the end positions of the piston may be incorporated into the tubular portion of the piston, into which the locking elements positively enter through the guide sleeve when the electromagnet is energized. The locking elements may be spheres which can be actuated by way of a thrust piece having a conical section and being guided inside the guide sleeve, wherein a plunger of the electromagnet operates on the thrust piece. Furthermore, a helical compression spring with a smaller preload force can be applied to the thrust piece at the end opposite the plunger of the electromagnet. This results in a structurally advantageous, nested design with optimum use of the available space within the tubular portion of the piston of the actuator.

Furthermore, the guide portion of the thrust piece receiving the helical compression spring may in the actuated state rest against at an end wall of the guide sleeve, wherein the spheres are hereby supported at a cylindrical end portion of the thrust piece. The spheres of the locking device can thus, if desired, be prevented from exerting a restoring moment on the thrust piece and/or the electromagnet when perturbing forces act on the piston. The lock is thus reliably effective.

In a particularly advantageous and easily installable embodiment, the guide sleeve and the housing of the electromagnet may be secured at the free end of the cylinder with several screws.

In order to maintain a reliable, permanent function of the actuator, the piston may be constructed at least in the region of the internal grooves of a higher-strength material and/or may be hardened, while the remaining piston and optionally the actuating rod may be made of a light metal. The guide sleeve and/or the locking elements or spheres may preferably be made of steel.

According to another, very advantageous embodiment of the invention, the preload spring engaging the parking lock may be arranged between the end wall of the guide sleeve and the end wall of the tubular section of the piston. This produces an actuator incorporating all functional parts including the preload spring, which can be readily installed in the transmission of the vehicle in particular as a preassembled unit.

Lastly, to ensure a reliable operation of the locking device and/or to prevent excessive forces on the locking elements, the hydraulic pressure supplied to the cylinder for disengaging the parking lock may be controlled via a pressure relief valve. In particular, the pressure relief valve may be a ball-spring valve integrated into the cylinder which is connected to a feed line of the hydraulic system.

BRIEF DESCRIPTION OF THE DRAWING

An exemplary embodiment of the invention will now be described in more detail with reference to the accompanying schematic drawing which shows a longitudinal section through an actuator for actuating a parking lock for an automatic transmission of motor vehicles.

DETAILED DESCRIPTION OF PREFERRED EMBODIMENTS

The illustrated actuator 10 is inserted in a transmission housing (not shown) of an automatic transmission for motor vehicles and has an only partially visible adjusting rod 12 which can be connected to a locking pawl 15. The locking pawl 15 forms in cooperation with a ratchet wheel 17 a widely known parking lock P inside the transmission.

The engagement "P in" and the disengagement "P out" of the parking lock P is controlled in a shift-by-wire system by way of the actuator 10, meaning that there is no mechanical connection between the selector lever of the automatic transmission and the locking pawl 15 of the parking lock P, but is instead effected electro-hydraulically by control parameters such as when the vehicle is stationary, a random park command, etc.

The actuator 10 is mainly composed of a piston 16 axially displaceable in a cylinder 14, a guide sleeve 18, a locking device 20 and an electromagnet 22 having a housing 22b, the electromagnet 22 actuating the locking device 20.

The piston 16 is arranged in the cylinder 14 liquid-tight by way of sealing rings 24, and is constructed either integrally with the actuating rod 12 (as shown) or securely connected therewith. The actuating rod 12 is sealed to the outside by way of another sealing ring 24 and guided by way of the guides (piston rings) 39.

The piston 16 encloses with the cylinder 14 a cylinder space 26, to which for actuating the piston 16 to the left in the drawing (P out), hydraulic pressure can be applied via a fitting 28 connected to an unillustrated hydraulic system.

By way of a preload spring 13, shown in the exemplary embodiment, the actuating rod 12 or directly the locking pawl 15 of the parking lock P is continuously biased in the opposite direction (P in) with a force $P_F$, so that the parking lock P is automatically engaged in the absence of hydraulic pressure. As illustrated in the exemplary embodiment, the actuating rod 12 is connected to a locking pawl 15 which can engage with a parking lock wheel 17 in the transmission.

The piston 16 has a tubular portion 16a into which, on the one hand, the guide sleeve 18 which is closed off by the end wall 18a and the electromagnet 22 and the locking device 20 are inserted.

The guide sleeve 18 is attached by way of its mounting flange 18b with one or more screws 30 (only one screw 30 is visible), which at the same time hold the electromagnet 22 via a yoke 32 without play.

The plunger 22a which is extendable when the electromagnet 22 is energized acts on a thrust piece 34 of the locking device 20, which is axially displaceably guided in the guide sleeve 18 by way of a cylindrical hollow guide section 34a.

The thrust piece 34 further includes a conical section 34b, which cooperates with the spheres 36 inserted in corresponding openings 18c of the guide sleeve 18 as radially extendible locking elements. The conical section 34b of the thrust piece 34 finally transitions into a cylindrical section 34c.

A helical compression spring 38 is inserted between the end wall 18a of the guide sleeve 18 and a cylindrical recess of the thrust piece 34, which biases the thrust piece 34 against the plunger 22a of the electromagnet 22 with a smaller force.

Two internal grooves 16b, 16c are incorporated in the tubular section 16a of the piston 16, into which the spheres 36 of the locking device 20 can radially outwardly enter when the pressure piece 34 is operated by way of the electromagnet 22 and/or the plunger 22a, thereby positively connecting the piston 16 via the guide sleeve 18 to the cylinder 14, which is fixed in relation to the housing.

In the illustrated position "P out" of the piston 16, the spheres 36 lock accordingly in the internal groove 16c of the piston 16 and lock in position "P in" in the internal groove 16b.

The locking device 20 thus operates as follows:

It will be assumed that hydraulic pressure is applied to the actuator 10 and/or the piston 16 by way of the system control, thereby moving them into the "P out" position, whereby the parking lock P is disengaged by the actuating rod 12. Simultaneously (or preferably slightly delayed), the electromagnet 22 is energized, whereby the thrust piece 34 is pushed by the plunger 22a in the drawing to the right.

The spheres 36 (for example, 2, 3 or 4 circumferentially distributed spheres may be used) are pushed radially outwardly by the conical section 34b of the thrust piece 34 and enter the internal groove 16c after passing through the guide sleeve 18. The thrust piece 34 rests against the end wall 18a after being further displaced, wherein the thrust piece 34 is dimensioned so that the cylindrical portion 34c supports the spheres 36 in this position or blocks them from returning radially inwardly.

The piston 16 is thus positively held in the cylinder 14 by the locking device 20, even in the event of an accidental failure of the hydraulic pressure in the cylinder space 26.

When the parking brake is to be engaged in a regular manner, the hydraulic pressure in the cylinder space 26 is released and the current flow to the electromagnet 22 is interrupted at the same time (or preferably before or thereafter), causing the parking lock P to be engaged by the force $P_F$ of the preload spring 13.

At the same time, or when restarting the vehicle (hydraulic system), the electromagnet 22 is energized again, at least temporarily, thereby activating the locking device 20 as described above, whereby the spheres 36 now enter the internal groove 16b of the piston 16 and again lock the piston 16.

This once more prevents an inadvertent release of the parking lock P, for example, due to a system error with a potentially gradual pressurization of the piston 16 of the actuator 10 due to a defective control valve of the hydraulic system.

The piston 16 of the actuator 10 may optionally be formed in two parts so that the tubular section 16a with the internal grooves 16b, 16c is made of a higher-strength material, for example steel, and optionally hardened, while the remaining piston 16 and optionally the actuating rod 12 may be made of a light metal, wherein the two components are then materially and/or positively connected to one another.

The guide sleeve 18 and the spheres 36 as locking elements are preferably made of steel and likewise hardened to prevent impermissible contact pressures during the locking function and in the presence of system errors.

The aforedescribed preload spring 13 acting on the actuating rod 12 with the preload force $P_F$ may be inserted, different from the exemplary embodiment, between the end wall 18a of the guide sleeve 18 and the end wall 16d used the piston 16, wherein the tubular section 16a of the piston 16 should then be longer in the axial direction. The actuator 10 could then form a preassembled unit also with the integrated preload spring 13, which could then be inserted in the transmission housing.

In the unillustrated hydraulic system for actuating the piston 16, a pressure relief valve (not shown) may optionally be provided which limits the hydraulic pressure acting on the piston to a defined pressure value, so as to prevent damage to the activated locking device in the event of a system error 20. The pressure relief valve may be a simple valve with a spring-loaded ball, which opens at an impermissible overpressure and drains hydraulic fluid into a connected return line of the hydraulic system or directly into the surrounding space (sump). Preferably, the pressure relief valve may also be integrated in the actuating device 10 and/or in the cylinder 14.

The invention claimed is:

1. An actuator for actuating a parking lock of a transmission, comprising:
   a piston which is guided in a cylinder and actuates via an actuating rod a locking pawl for a parking lock wheel in the transmission, wherein the piston disengages the parking lock with an applied hydraulic pressure against a force of an integrated preload spring and wherein the preload spring engages the parking lock in an unpressurized state, and
   a locking device electromagnetically actuatable by an electromagnet and configured to positively lock the piston in a disengaged position and to secure the piston relative to a guide sleeve attached to the cylinder by way of radially extendible locking elements, wherein the piston can be positively secured by way of the locking device also when the parking lock is engaged,
   wherein the preload spring that engages the parking lock is arranged between an end wall of the guide sleeve and an end wall of a tubular section of the piston.

2. The actuator of claim 1, wherein the transmission is an automatic transmission of a motor vehicle.

3. The actuator of claim 1, wherein the locking elements are spheres which can be actuated by a thrust piece having a conical section and being guided inside the guide sleeve, wherein a plunger of the electromagnet acts upon the thrust piece.

4. The actuator of claim 3, further comprising a helical compression spring which biases the thrust piece against the plunger with a smaller preload force.

5. The actuator of claim 4, wherein the thrust piece comprises a guide portion which accommodates the helical compression spring and rests in the actuated state against the end wall of the guide sleeve and wherein the spheres hereby rest against a cylindrical end section of the thrust piece.

6. The actuator of claim 3, wherein the spheres are made of steel.

7. The actuator of claim 1, wherein the guide sleeve and a housing of the electromagnet are attached to a free end face of the cylinder with at least one screw.

8. The actuator of claim 1, wherein the piston comprises the tubular section, and wherein the locking device with the guide sleeve and the electromagnet are arranged inside the tubular section of the piston.

9. The actuator of claim 8, wherein the tubular section of the piston comprises two internal grooves corresponding to end positions of the piston, and wherein the locking elements positively enter the two internal grooves by passing through the guide sleeve when the electromagnet is energized.

10. The actuator of claim 9, wherein the piston is at least in a region of the two internal grooves made of a high-strength material or hardened.

11. The actuator of claim 1, wherein the guide sleeve or the locking elements, or both, are made of steel.

12. An actuator for actuating a parking lock of a transmission, comprising:
    a piston which is guided in a cylinder and actuates via an actuating rod a locking pawl for a parking lock wheel in the transmission, wherein the piston disengages the parking lock with an applied hydraulic pressure against a force of an integrated preload spring and wherein the preload spring engages the parking lock in an unpressurized state, and
    a locking device electromagnetically actuatable by an electromagnet and configured to positively lock the piston in a disengaged position and to secure the piston relative to a guide sleeve attached to the cylinder by way of radially extendible locking elements, wherein the piston can be positively secured by way of the locking device also when the parking lock is engaged,
    wherein the piston comprises a tubular section, and wherein the locking device with the guide sleeve and the electromagnet are arranged inside the tubular section of the piston.

* * * * *